United States Patent [19]

Haden

[11] Patent Number: 5,895,595
[45] Date of Patent: Apr. 20, 1999

[54] APPARATUS FOR MAKING BEVERAGES

[75] Inventor: John Denis Haden, Lichfield, United Kingdom

[73] Assignee: D. H. Haden PLC, United Kingdom

[21] Appl. No.: 08/859,057

[22] Filed: May 21, 1997

[30] Foreign Application Priority Data

May 23, 1996 [GB] United Kingdom ............... 9610814

[51] Int. Cl.⁶ .................... A47J 31/00; F27D 11/02
[52] U.S. Cl. .............. 219/432; 219/428; 219/433; 219/446; 219/479; 219/480; 99/290; 99/323.3
[58] Field of Search .............. 219/385–387, 219/429, 428, 432, 433, 435, 443, 445, 446, 415, 417, 447, 476, 479, 480; 99/284, 290, 291, 323.3

[56] References Cited

U.S. PATENT DOCUMENTS

| | | | |
|---|---|---|---|
| 2,551,219 | 5/1951 | Peters et al. | 219/446 |
| 3,808,825 | 5/1974 | Ciurea | 219/386 |
| 3,915,079 | 10/1975 | Balderson | 219/432 |
| 3,969,610 | 7/1976 | Ratti et al. | 219/441 |
| 4,145,603 | 3/1979 | Mackay et al. | 219/432 |
| 4,164,644 | 8/1979 | Remsnyder et al. | 219/433 |
| 4,442,343 | 4/1984 | Genuit et al. | 219/443 |
| 4,621,186 | 11/1986 | Taylor et al. | 219/441 |
| 4,812,623 | 3/1989 | Haden et al. | 219/432 |
| 4,825,757 | 5/1989 | Stoner | 219/432 |
| 5,019,691 | 5/1991 | Lai | 219/432 |

*Primary Examiner*—John A. Jeffery
*Assistant Examiner*—J. Pelham
*Attorney, Agent, or Firm*—Neil F. Markva

[57] ABSTRACT

The apparatus for making beverages comprises a kettle 15, a stand 10 and separable electrical connector means 16a,b to automatically connect the kettle with an electrical power supply connector in the stand when the kettle is placed on the stand; the stand is extended and provides a platform for a pot 13 and an electric heating member 14 is provided to heat a vessel on the platform alongside the kettle, and is provided with switch means to selectively energize the heating member and/or the kettle.

10 Claims, 3 Drawing Sheets

APPARATUS FOR MAKING BEVERAGES

BACKGROUND OF THE INVENTION

For example, coffee making apparatus comprising a water boiling and hot plate unit and a separable coffee jug is known, in which water is boiled in the unit so that it is propelled through a coffee holding filter to drain into the jug while the jug is disposed on the hot plate.

For further example, tea making apparatus, known as a "Teasmaid", comprises a clock controlled water boiling unit and a separable tea pot, in which unit stored water is boiled in the unit at a pre-set time to be propelled through a delivery pipe to the tea pot placed in a predetermined position below the delivery pipe.

However, most known forms of such apparatus are dedicated to the production of a single specific kind of beverage, and for this reason beverages are made quite often by boiling water in an electric kettle and pouring the boiled water into a suitable beverage receptacle such as a cup, tea pot, coffee pot or jug.

Electric kettles, of a kind known as "cordless kettles" which comprise a kettle, a stand and separable electrical connector means to automatically connect the kettle with an electrical power supply connector in the stand when the kettle is placed on the stand, are particularly convenient for such purposes.

While it is quite common to find examples of all these forms of apparatus in a home, e.g. a tea-maker in a bedroom, a coffee maker in the dining room and an electric kettle in the kitchen, the provision of such levels of equipment is often ergonomically inconvenient, excessively expensive, bulky or otherwise problematical, e.g. for guest rooms in hotels.

SUMMARY OF THE INVENTION

In order to avoid this problem, the present invention provides apparatus comprising a cordless electric kettle of said kind which is characterized in that the stand is extended and provides a platform and an electric heating member is provided to heat a vessel on the platform alongside the kettle, and is provided with switch means to selectively energise the heating member and/or the kettle.

The stand is preferably of shallow form to serve as a tray for carrying the vessel and kettle.

Tea and coffee pots of similar base dimensions are preferably provided for alternative use on said platform.

The platform is preferably provided at the bottom of a shallow socket in the stand, which socket is preferably deep enough to support the pot against small lateral forces. The stand preferably also provides a kettle receiving socket.

The switch means preferably allows the kettle to be operated without the heating member being energized, and the heating member to be energized while the kettle is removed.

The kettle may be of automatic form incorporating heat responsive means to open a switch to cut-off the power to the heating element when a predetermined temperature e.g. element temperature or a steam temperature, is reached, and manually actuable means to close the switch.

The switch means preferably comprises a thermostatic switch responsive to production of steam by the kettle to de-energize the kettle, and manually settable means to energize the heating member.

The switch means preferably includes a delay cut-out set to de-energize the heating member or both the heating member and kettle after a predetermined period has elapsed, e.g. to avoid wasting energy and protect the apparatus against excessively prolonged heating if a person leaves the apparatus unattended and switched "on".

The stand may be provided with a clock, a timer or a combined clock and timer. The timer is preferably presettable to control the energization of both the kettle and the heating member. The clock and/or timer may actuate one or more items of auxilliary equipment, e.g. an alarm, a radio and/or a lamp.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION

Figure 1:
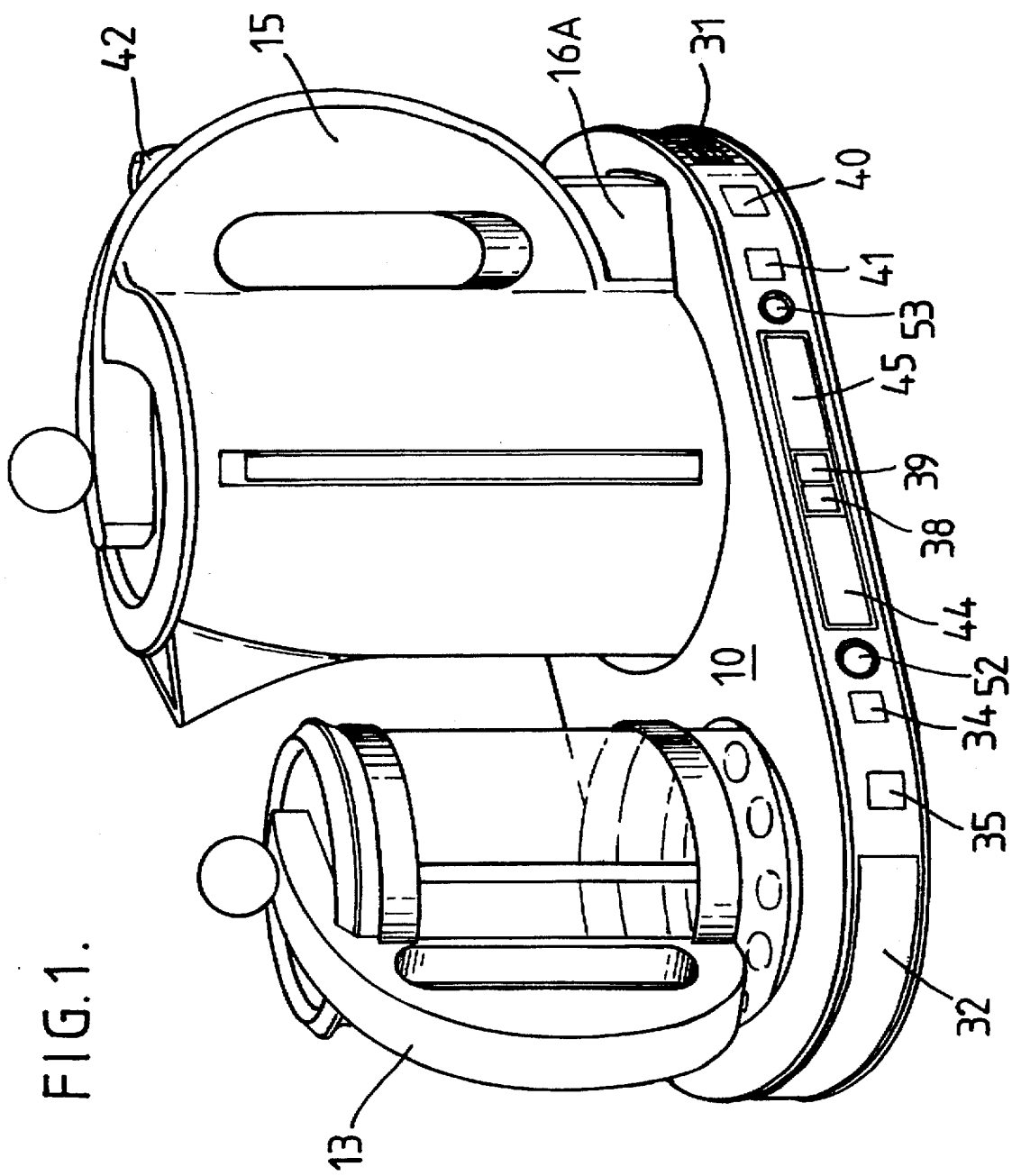
FIG. 1 shows a perspective view of apparatus of the invention.
Figure 2:
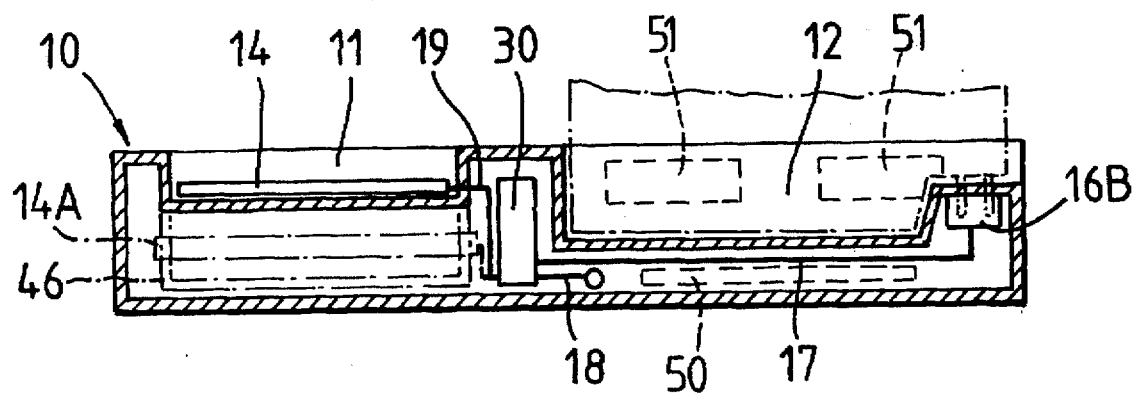
FIG. 2 is a sectional diagram through a stand of the apparatus.

Referring to FIGS. 1 and 2, the apparatus comprises a stand 10 providing two shallow sockets 11 and 12 respectively for a pot 13 to be warmed by a heating member such as an electrical heating element or hot plate 14 providing a platform at the base of the socket 11, and an automatic electric kettle 15 of cordless form.

The electric kettle and stand are provided with a plug and socket form of separable electrical connection means 16A and 16B, which makes an electrical connection between the heating element 43 (FIGS. 3 and 4) of the kettle and an electric kettle supply lead 17 to the kettle connector means 16B within the stand.

The stand has connected thereto a mains electrical supply lead and switch means to selectively supply current from the mains lead 18 to the kettle supply lead 17 or to a heating member supply lead 19.

Figure 3:
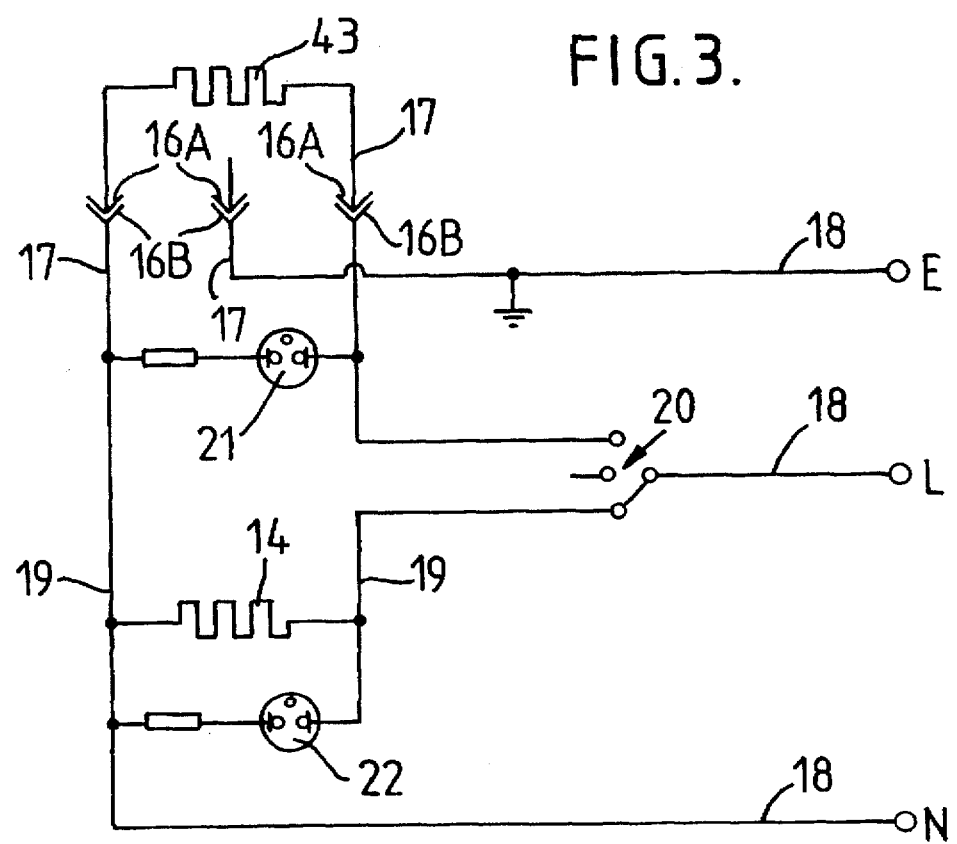
FIG. 3 shows a simple electrical circuit for operation of the apparatus.

Referring to FIG. 3, in a simple form of the apparatus employing a non-automatic form of the electric kettle, the switch means comprises a three position switch 20 providing an "off" position between a kettle energizing position and a heating member energizing position. Neon indicators 21, 22 are connected respectively in the circuits of the leads 17 and 19 to indicate respectively when the kettle and heating member are energized.

The switch means shown in FIG. 3 may be modified if an automatic form of electric kettle is employed. In such an embodiment the switch means includes the manually resettable steam sensitive switch 42 incorporated in known manner into the kettle so that the kettle switch switches off automatically upon boiling after being switched on or reset manually; and the circuit is modified so that the switch 20 controls only the hot plate 14 and so that the live socket terminal 16B is connected directly to the live lead 18 instead of the switch 20.

Figure 4:
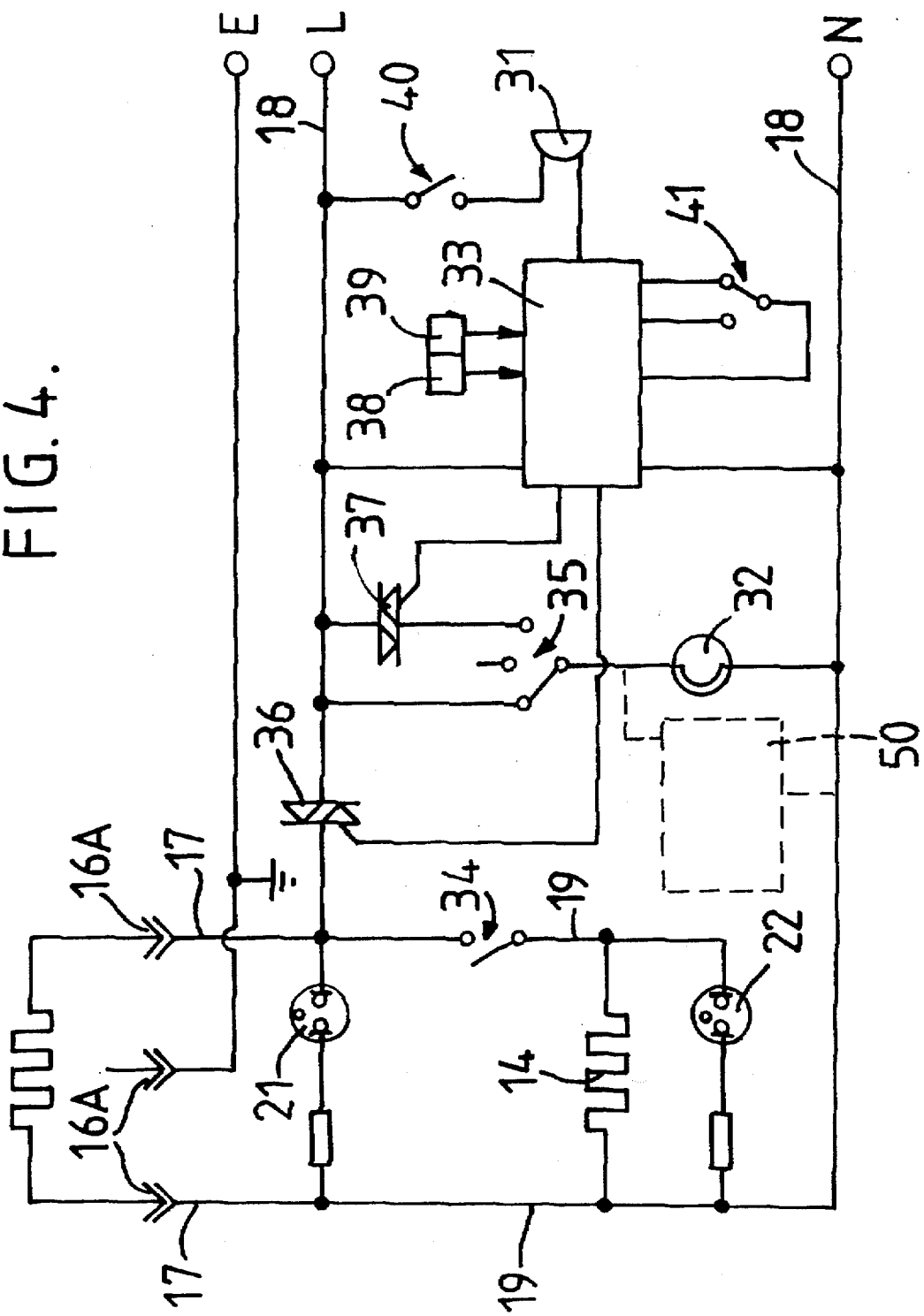
FIG. 4 shows an electrical circuit diagram for the apparatus shown in FIGS. 1 and 2.

Referring to FIG. 4, the switch means for the apparatus shown in FIGS. 1 and 2 is more complex and comprises a module 30 incorporating control circuitry for auxiliary devices including a buzzer 31 and a lamp 32 to emit sound and light from the base.

The circuitry comprises a clock timer unit 33. The clock is settable by a manual input control 38. The timer acts via a setting switch 34 to control a triac 36 to energize the kettle and the heating member, and to control a triac 37 to energize the lamp 32 when a mode switch 35 is appropriately set, at predetermined times which can be preset by a manual input control 39. Similarly when an alarm switch 40 is closed, the alarm buzzer is actuated or about said preset times directly from the unit 33 without the use of a triac.

The unit 33 is controlled by a timer on/off switch 41, and the unit is arranged so that when the timer is switched off, the triac 36 is energized to energize the kettle, or both the kettle and heating member supply lines, so that heating of the kettle and pot can be manually controlled, by the kettle's switch 42 and the switch 34.

There is no manual switch for the kettle, except from the switch 42 on the kettle itself which shown in FIG. 1 but not the in the circuit of FIG. 4.

The settings of the clock and timer are displayed at the periphery of the base by respective displays 44 and 45. The circuitry is organized so that the apparatus can be used as a timed lamp or as a standby lamp, an alarm clock, a timed or manually operated electric kettle, or a timed or manually operated hot plate.

It will be readily appreciated that each item of the apparatus retains its own individual function, namely the cordless kettle may be used with a suitable cordless kettle stand instead of the duplex stand 10. The cafetiere or the like could be used in an ordinary manner without being placed in the warming socket 11 and could be substituted by a milk warming pan, teapot or other vessel to be kept warm. Depending upon the function and organization of the base, it can be used as an alarm clock or alarm light with or without the kettle and any beverage holding vessel. The vessel may however be a universal beverage maker having a fitting to receive tea, coffee or other flavoring solids, and a filter to allow water to drain from or percolate through said solids.

A notable feature of the stand is its very shallow height enabling it to be stored conveniently, or used as a convenient tray on which to carry the vessels located thereon.

The invention is not confined to details of the foregoing example and many variations are possible within the scope of the invention. For example, the socket 11 may be deepened, the base thereof may provide the platform, and the heating member, e.g. the annular element 14A, may be disposed in or on the wall 46, as indicated in broken lines in FIG. 2, to heat the wall of a vessel in the socket. This variant is particularly useful for heating cafetieres and like beverage vessels in which solid matter is held in the bottom part of the vessel. Optional ancilliary devices, e.g. a radio, may be connected in parallel with the lamp 32 or in direct circuit with the triac 37 for timed energization. Such a radio 50 may be built into the stand and have its speaker 51 or speakers at the rear of the stand, and timing and volume controls 52, 53 at the front of the stand.

The invention further provides and includes apparatus for boiling or heating water comprising any novel feature, part or combination thereof disclosed herein or in the accompanying drawings.

I claim:

1. Apparatus for making beverages comprising:

a) a cordless electric kettle, a stand, and separable electrical connector means to automatically electrically connect the kettle with an electrical power supply connector in the stand when the kettle is placed on the stand, b) the stand includes an extended portion having an electrical vessel heating member providing a platform for a vessel, and single manually operable switch means having an off-position, a kettle energizing position and a heating member energizing portion, c) said vessel heating member being effective to heat a vessel when disposed on the platform at a location alongside the kettle, and d) said single switch means being effective to selectively energize the vessel heating member and/or the kettle to operate the kettle without energizing said vessel heating member and to energize the vessel heating member while the kettle is removed.

2. Apparatus as claimed in claim 1 wherein the vessel is a pot comprising means to contain flavoring solids.

3. Apparatus as claimed in claim 2 wherein the platform is disposed at the bottom of a shallow socket in the stand, which socket is deep enough to support the pot against small lateral forces.

4. Apparatus as claimed in claim 1 wherein the stand includes a kettle receiving socket.

5. Apparatus for making beverages comprising:

a) a cordless electric kettle, a stand, and separable electrical connector means to automatically electrically connect the kettle with an electrical power supply connector in the stand when the kettle is placed on the stand, b) the stand includes an extended portion having an electrical vessel heating member providing a platform for a vessel, c) said vessel heating member being effective to heat a vessel when disposed on the platform at a location alongside the kettle, and d) the kettle includes a kettle heating element, a cut-off switch, and manually resettable temperature sensitive switch means having heat responsive means effective to open said switch to cut-off the power to the kettle heating element when a predetermined temperature is reached, and e) said switch means includes manually actuable means to control said vessel heating member.

6. Apparatus as claimed in claim 5 wherein the timer is pre-settable to control the energization of both the kettle and the heating member.

7. Apparatus as claimed in claim 5 wherein the stand includes a clock, a timer or a combined clock and timer.

8. Apparatus for making beverages comprising:

a) a cordless electric kettle including kettle switch means, a stand, and separable electrical connector means to automatically electrically connect the kettle with an electrical power supply connector in the stand when the kettle is placed at a first location on the stand, b) an electrical heating member providing a platform at another location on the stand to heat a vessel on the platform alongside the kettle, and c) electric control circuit means including clock timer means, clock time on/off switch means, and setting switch means to energize the heating member and the kettle.

9. Apparatus as claimed in claim 8 wherein the control circuit means includes means to energize the kettle when the clock timer on/off switch means is switched off.

10. Apparatus as claimed in claim 8 wherein said control circuit means includes means to energize both the kettle and heating member so that the heating of the kettle and a vessel can be manually controlled by the kettle switch means and the setting switch means when the clock timer on/off switch means is switched off.

\* \* \* \* \*